United States Patent
Suzuki et al.

(10) Patent No.: US 8,324,845 B2
(45) Date of Patent: Dec. 4, 2012

(54) RECHARGEABLE POWER TOOL, CONTROL UNIT AND RECORDING MEDIUM

(75) Inventors: Jiro Suzuki, Anjo (JP); Fengying Dong, Anjo (JP); Takuya Kusakawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 625 days.

(21) Appl. No.: 12/453,830

(22) Filed: May 22, 2009

(65) Prior Publication Data

US 2009/0295313 A1    Dec. 3, 2009

(30) Foreign Application Priority Data

May 30, 2008 (JP) ................................ 2008-142707

(51) Int. Cl.
*H02P 7/00* (2006.01)
(52) U.S. Cl. ..................... 318/139; 318/696; 388/937
(58) Field of Classification Search .............. 318/696, 318/139; 388/937
See application file for complete search history.

(56) References Cited

U.S. PATENT DOCUMENTS

| | | | | |
|---|---|---|---|---|
| 4,851,743 A | * | 7/1989 | Schmerda et al. | 388/811 |
| 7,274,866 B2 | * | 9/2007 | Rudolf et al. | 388/824 |
| 2004/0239293 A1 | * | 12/2004 | Mori et al. | 320/132 |
| 2005/0077878 A1 | | 4/2005 | Carrier et al. | |
| 2005/0183870 A1 | * | 8/2005 | Wada et al. | 173/128 |
| 2008/0180059 A1 | * | 7/2008 | Carrier et al. | 320/112 |

FOREIGN PATENT DOCUMENTS

| | | |
|---|---|---|
| GB | 2 425 903 A | 11/2005 |
| JP | A-5-174874 | 7/1993 |
| JP | A-2006-026850 | 2/2006 |
| JP | A-2006-218605 | 8/2006 |
| JP | A-2007-203387 | 8/2007 |
| WO | WO 2009/102082 A2 | 8/2009 |

OTHER PUBLICATIONS

Extended European Search Report issued in European Application No. 09007022.8 dated Jul. 19, 2012.

* cited by examiner

*Primary Examiner* — Walter Benson
*Assistant Examiner* — Bryan Gordon
(74) *Attorney, Agent, or Firm* — Oliff & Berridge, PLC

(57) ABSTRACT

A rechargeable power tool includes a direct current motor, a switching circuit, at least one speed setting unit, a duty ratio setting unit, a drive unit, an operation amount detecting unit, an abnormality determining unit, and a determination threshold setting unit. The abnormality determining unit compares an operation amount detected by the operation amount detecting unit and a determination threshold set based on the operation amount to thereby determine whether or not an operation state of the rechargeable power tool is abnormal. The determination threshold setting unit sets the determination threshold in a continuous or stepwise manner in accordance with a rotation speed set by the speed setting unit.

10 Claims, 7 Drawing Sheets

FIG. 4A

| LEVEL | DUTY [%] | LOCK DETERMINATION TIME [s] | VOLTAGE DETECTION THRESHOLD [V] |
|---|---|---|---|
| 1~4 | 10 | 10 | 12.5 |
| 5 | 12 | 9 | 12.4 |
| 6 | 13 | | |
| 7 | 14 | 8 | 12.4 |
| 8 | 16 | | |
| 9 | 18 | | |
| 10 | 20 | 7 | 12.3 |
| 11 | 21 | | |
| 12 | 22 | 6 | 12.3 |
| 13 | 24 | | |
| 14 | 26 | 5 | 12.2 |
| 15 | 28 | | |
| 16 | 30 | 4 | 12.1 |
| 17 | 32 | 3 | 12.0 |
| 18 | 34 | 2 | 11.9 |
| 19 | 36 | 1 | 11.8 |
| 20 | 38 | | |

FIG. 4B

| LEVEL | DUTY [%] | LOCK DETERMINATION TIME [s] | VOLTAGE DETECTION THRESHOLD [V] |
|---|---|---|---|
| 1~3 | 10 | 10 | 12.5 |
| 4 | 14 | 8 | 12.4 |
| 5 | 16 | | |
| 6 | 18 | | |
| 7 | 26 | 5 | 12.2 |
| 8 | 28 | | |
| 9 | 36 | 1 | 11.8 |
| 10 | 38 | | |
| 11 | 45 | 0.8 | 11.3 |
| 12 | 50 | 0.6 | 10.9 |
| 13 | 52 | 0.5 | 10.7 |
| 14 | 55 | 0.4 | 10.6 |
| 15 | 58 | 0.3 | 10.4 |
| 16 | 60 | 0.2 | 9.3 |
| 17 | 61 | | |
| 18 | 63 | | |
| 19 | 64 | | |
| 20 | 65 | | |

FIG. 4C

| LEVEL | DUTY [%] | LOCK DETERMINATION TIME [s] | VOLTAGE DETECTION THRESHOLD [V] |
|---|---|---|---|
| 1~3 | 10 | 10 | 12.5 |
| 4 | 26 | 5 | 12.2 |
| 5 | 36 | 1 | 11.8 |
| 6 | 43 | 0.8 | 11.3 |
| 7 | 45 | | |
| 8 | 52 | 0.5 | 10.7 |
| 9 | 53 | | |
| 10 | 58 | 0.3 | 10.4 |
| 11 | 60 | 0.2 | 10.1 |
| 12 | 66 | 0.1 | 9.2 |
| 13 | 68 | | |
| 14 | 70 | | |
| 15 | 80 | 0.08 | 8.6 |
| 16 | 84 | | |
| 17 | 88 | 0.07 | 7.4 |
| 18 | 91 | | |
| 19 | 94 | | |
| 20 | 100 | | |

RECHARGEABLE POWER TOOL, CONTROL UNIT AND RECORDING MEDIUM

CROSS-REFERENCE TO RELATED APPLICATIONS

This application claims the benefit of Japanese Patent Application No. 2008-142707 filed May 30, 2008 in the Japan Patent Office, the disclosure of which is incorporated herein by reference.

BACKGROUND

The present invention relates to a rechargeable power tool that includes a direct current motor which is rotated by electric power from a battery (a rechargeable battery) as a power source and controls rotation speed of the direct current motor in accordance with an operation state of a speed setting switch such as a trigger switch and others.

A conventionally known rechargeable power tool of this type includes a bridge circuit (in other words, an inverter circuit) which is constituted by switching devices (high-side switches and low-side switches), each provided between each of terminals of the direct current motor and a positive terminal and a negative terminal of a direct current power source (a battery), as a drive circuit for the direct current motor.

In the rechargeable power tool constituted as above, when a user operates a trigger switch as a speed setting switch, a controller sets a driving duty ratio for PWM controlling the direct current motor based on an operation amount of the trigger switch, and turns on/off the switching devices in the bridge circuit in accordance with the driving duty ratio, thereby controlling a rotation of the direct current motor.

Also known is a rechargeable power tool provided, other than the above-described trigger switch, with a speed selector as a speed setting switch which can switch a rotation speed of the direct current motor, for example, between two modes, that is, a high speed mode and a low speed mode. In the rechargeable power tool constituted as such, when a user sets the speed selector either to a high speed mode or to a low speed mode (switching operation) and draws the trigger switch, the controller controls the direct current motor such that the rotation speed of the direct current motor becomes a rotation speed corresponding to either of the selected speed modes. A rotational driving force of the direct current motor is transmitted to a tool output shaft directly or via a deceleration mechanism and so on.

In a rechargeable power tool, when an abnormal state, like mechanical locking of the direct current motor, malfunction of the controller, or short circuit of the direct current motor as a load, is generated during driving of the direct current motor as a power source, an excess current may flow into the direct current motor and the drive circuit therefor, thereby causing these components to be heated and burnt out in some cases.

Accordingly, the rechargeable power tool usually includes a protection circuit. The protection circuit determines whether or not the rechargeable power tool is in the above-described abnormal state during driving of the direct current motor. When it is determined that the rechargeable power tool is in an abnormal state, the protection circuit performs protective operation like stopping the driving of the direct current motor.

The protection circuit may be configured in various manners. For example, the protection circuit may include a current detector that detects a current value of the direct current motor. When the current value exceeds a certain threshold, it is determined that the direct current motor is in an abnormal state (an excess current is generated).

In recent years, however, various methods are proposed for detecting an excess current without providing the current detector in order to achieve miniaturization of the circuit and cost reduction. An example of such methods is disclosed in Unexamined Japanese Patent Publication No. 5-174874 in which when a monitored battery voltage is decreased by generation of an excess current due to a load short circuit, application of current to a load is stopped (switching devices provided on a current path are turned off).

SUMMARY

If the above-described technique for excess current detection based on a decrease in battery voltage is applied to a tool provided with a speed setting switch and configured to PWM control a direct current motor in accordance with a setting of the speed setting switch, an abnormal state (an excess current) may not be accurately detected depending on a setting of a rotation speed of the direct current motor.

Specifically, in the case of PWM controlling the direct current motor, when the switching devices are turned on, the current value of the direct current motor is increased while the battery voltage is gradually decreased. If an on-state of the switching devices is continued, the increase in the current value and the decrease in the battery voltage come to stop and a steady state is developed. When the switching devices are turned off, the current value is gradually decreased toward zero (0), while the battery voltage is gradually increased toward an open voltage. Whether or not the steady state is developed during an on-period of the switching devices depends on a time constant of a current path and a driving duty ratio (i.e., a length of the on-period).

Here, when the rechargeable power tool comes into an abnormal state and an excess current is generated during application of current to the direct current motor, the battery voltage is decreased more than normal.

Accordingly, the protection circuit may be configured such that, for example, a predetermined voltage value lower than a battery value when current is steadily applied to the direct motor is set as a voltage detection threshold for excess current determination. When the battery voltage becomes lower than the voltage detection threshold, it is determined that an excess current is generated and protective operation is performed.

However, the lower the speed set by the speed setting switch is, the smaller the driving duty ratio becomes and the shorter the on-period of the switching devices becomes. Therefore, in a transient state after a application of current is started by turning-on of the switching devices, the lower the set speed is, the smaller the decrease in the battery voltage. Particularly, a rising of the applied current and the decrease in the battery voltage are dependent on the driving duty ratio in PWM control. The lower the driving duty ratio is (i.e., the lower the set speed is), the shorter the time during which the battery voltage is decreased and the smaller the decrease in the battery voltage becomes.

The voltage detection threshold may be set low based on a case when, for example, the driving duty ratio is large (i.e., when the set speed is high). Then, even if the rechargeable power tool is turned into an abnormal state when the set speed is low, and an excess current is generated during the on-time of the switching devices, the switching devices are turned off before the battery voltage falls below the voltage detection threshold. The battery voltage is started to increase again and thus the excess current may not be able to be detected.

In order to inhibit the above situation from happening, the voltage detection threshold may be set high based on a case where the driving duty ratio is small (i.e., when the set speed is low). Then, the battery voltage falls below the voltage detection threshold although the rechargeable power tool is in a normal state when the driving duty ratio is large. An excess current may be mistakenly detected.

A locked state of the direct current motor is one example of abnormal states. Various methods are known to detect a locked state. Particularly, there is a method of detecting a locked state by providing a rotary sensor that outputs a pulse signal each time the direct current motor is rotated a given amount. If the pulse signal is not outputted from the sensor within a predetermined lock determination time, it is determined that the direct current motor is in a locked state.

In this case as well, if the lock determination time is set long based on a case, for example, where the driving duty ratio is small (i.e., the set speed is low), the higher the speed set by the speed setting switch is, the longer the time during which an excess current flows when the direct current motor is in a locked state.

In order to inhibit the above situation from happening, the lock determination time may be set short based on a case where the driving duty ratio is large (i.e., when the set speed is high). Then, the pulse signal is not outputted from the sensor within the lock determination time although the rechargeable power tool is in a normal state when the driving duty ratio is small. A locked state may be mistakenly detected.

In one aspect of the present invention, it is preferable, in a rechargeable power tool which PWM controls a rotation of a direct current motor in accordance with a set speed, that detection of an abnormal state of the tool may be ensured despite the set speed.

A rechargeable power tool in a first aspect of the present invention includes a direct current motor, a switching circuit, at least one speed setting unit, a duty ratio setting unit, a drive unit, an operation amount detecting unit, an abnormality determining unit, and a determination threshold setting unit. The direct current motor is rotated by electric power supplied from a direct current power source and drives a tool output shaft. The switching circuit includes at least one switching device provided on a current path from the direct current power source to the direct current motor. The speed setting unit is operated by a user to set a rotation speed of the direct current motor. The duty ratio setting unit sets a driving duty ratio for PWM controlling the direct current motor through the switching circuit based on the rotation speed set by operation of the speed setting unit. The drive unit turns on/off the at least one switching device in the switching circuit in accordance with the driving duty ratio set by the duty ratio setting unit to thereby rotate the direct current motor. The operation amount detecting unit detects at least one type of operation amount which directly or indirectly indicates an operation state of the rechargeable power tool excluding a current value of the direct current motor when the direct current motor is rotated by the driving unit. The abnormality determining unit compares the operation amount detected by the operation amount detecting unit and a determination threshold set based on the operation amount to thereby determine whether or not the operation state of the rechargeable power tool is abnormal. The determination threshold setting unit sets the determination threshold in a continuous or stepwise manner in accordance with the rotation speed set by the speed setting unit.

In the chargeable power tool configured as above, while the direct current motor is rotated, the operation state of the rechargeable power tool is determined based on the operation amount detected by the operation amount detecting unit and the determination threshold set by the determination threshold setting unit. At this time, if the determination threshold is fixed to a constant value, determination by the abnormality determining unit may not be accurately performed depending on the rotation speed set by the speed setting unit (and the driving duty ratio set by the duty ratio setting unit).

In the present invention, the determination threshold is not fixed to a constant value but is changed (set in a continuous or stepwise manner) in accordance with the ration speed set by the speed setting unit (and in accordance with the driving duty ratio).

How to particularly change the determination threshold in accordance with the set rotation speed (driving duty ratio) may be considered arbitrarily. For example, per the set rotation speed, degrees of change in the operation amount expected may be assumed in case that an abnormal state is generated while the direct current motor is rotated at the rotation speed. The determination threshold may be set such that the change in the operation amount can be reliably detected.

Therefore, according to the rechargeable power tool in the first aspect of the present invention, since the determination threshold is set to be changed in a continuous or stepwise manner according to the set rotation speed, appropriate determination thresholds may be sequentially set to the rotation speeds from time to time. Accordingly, despite the set rotation speed, an abnormal state of the rechargeable power tool can be reliably detected.

In the rechargeable power tool, the operation amount detecting unit may detect voltage of a rechargeable battery which is the direct current power source as the operation amount. The determination threshold setting unit may set the voltage threshold as a determination threshold to a lower value as the rotation speed set by the speed setting unit is larger. The abnormality determining unit may determine that the operation state of the rechargeable power tool is abnormal in case that the voltage of the rechargeable battery detected by the operation amount detecting unit is lower than the voltage threshold.

When an abnormal state is generated such that an excess current flows into the direct current motor, the voltage of the rechargeable battery is decreased than normal. As the set rotation speed is larger (i.e., as the driving duty ratio is larger and on-time is longer), a degree of decrease in the rechargeable battery voltage becomes larger at the time of an excess current.

Therefore, by setting the voltage threshold lower as the set rotation speed is larger and using the voltage threshold, determination on an abnormal state based on decrease in the rechargeable battery voltage can be reliably performed.

In the rechargeable power tool, the operation amount detecting unit may output a detection signal as the operation amount each time the direct current motor is rotated a constant amount. The determination threshold setting unit may set a time threshold as the determination threshold to a lower value as the rotation speed set by the speed setting unit is larger. The abnormality determining unit may determine that the operation state of the rechargeable power tool is abnormal in case that the time during which the detection signal is not outputted from the operation amount detecting unit is equal to or more than the time threshold.

One example of an abnormal state is a locked state. When the direct current motor is not in a locked state but in a normal state, a number of detection signals outputted per a constant time each time the direct current motor is rotated a constant amount accords with the set rotation speed. In other words, the higher the set rotation speed is, the more detection signals are outputted per constant time. On the other hand, if the direct current motor is in a locked state, the number of detection signals outputted per constant time is suddenly decreased (or none).

Therefore, a locked state can be determined by setting the time threshold and determining whether or not the time during which the detection signal is not outputted has continued for the time threshold or above. In this case, at high speed rotation in which the set rotation speed is high, many detection signals are outputted for a constant time in a normal state. Conversely, a few detection signals are outputted at low speed rotation.

Thus, the time threshold is set shorter as the set rotation speed is higher. Using the time threshold, a locked state as one of abnormal states can be reliably and promptly determined despite the set rotation speed.

In the rechargeable power tool, the operation amount detecting unit, the determination threshold setting unit, and the abnormality determining unit may be configured as follows. Specifically, the operation amount detecting unit detects the voltage of the rechargeable battery as one of the operation amount and output a detection signal as one of the operation amount each time the direct current motor is rotated a constant amount. Also, the determination threshold setting unit sets the voltage threshold and the time threshold as the determination threshold such that the voltage threshold is lower as the rotation speed set by the speed setting unit is larger and the time threshold is shorter as the rotation speed set by the speed setting unit is larger. The abnormality determining unit determines that the operation state of the rechargeable power tool is abnormal if the voltage of the rechargeable battery detected by the operation amount detecting unit is lower than the voltage threshold or if the time without output of the detection signal from the operation amount detecting unit is equal to or more than the time threshold.

The above-described rechargeable power tool has both a function of determining an abnormal state based on the rechargeable battery voltage and a function of detecting a locked state. Therefore, according to such rechargeable power tool, an abnormal state can be much reliably determined.

The speed setting unit may be configured in various manners. For example, the speed setting unit may include a speed selector, a trigger switch, or both the speed selector and the trigger switch.

Specifically, the speed setting unit may include a speed selector that is used for selectively setting the rotation speed of the direct current motor by user operation to at least two modes. The duty ratio setting unit sets the driving duty ratio based on the operation state of the speed selector.

Or, the speed setting unit may include a trigger switch that is used for setting the rotation speed of the direct current motor in accordance with the operation amount by a user. The duty ratio setting unit may set the driving duty ratio in accordance with the operation amount of the trigger switch.

Or, the speed setting unit may include a speed selector and a trigger switch. The speed selector is used for selectively setting a speed mode of the direct current motor by user operation to at least two modes. The trigger switch is used for setting the rotation speed of the direct current motor in accordance with the operation amount by a user. The duty ratio setting unit may set the driving duty ratio in accordance with the operation amount of the trigger switch and such that a maximum driving duty ratio which is the driving duty ratio when the operation amount is the largest is different per speed mode.

Which one of the above three configurations to adopt can be arbitrarily determined according to a specification required for a tool. In each configuration, the rotation speed is set (the driving duty ratio is set) by user operation. In accordance with the settings, the determination threshold is appropriately set. Thus, an abnormal state can be reliably determined.

The rechargeable power tool may further include a protecting unit that protects the direct current motor by stopping application of current to the direct current motor when it is determined by the abnormal determining unit that the operation state of the rechargeable power tool is abnormal.

Application of current to the direct current motor may be stopped in various manners. Particularly, for example, all the switching devices in the switching circuit may be turned of by setting the driving duty ratio to zero (0). Or, a switch may be provided on a current path from the rechargeable battery to the direct current motor and, by turning off the switch, power supply to the direct current motor may be forcibly interrupted.

According to the rechargeable power tool configured as above, when the operation state is determined abnormal, application of current to the direct current motor is stopped. Thus, the direct current motor can be reliably protected from abnormal states and the rechargeable power tool can be reliably protected.

A control unit of a rechargeable power tool in a second aspect of the present invention includes a duty ratio setting unit, a drive unit, an operation amount detecting unit, an abnormality determining unit, and a determination threshold setting unit. The duty ratio setting unit sets a driving duty ratio for PWM controlling a direct current motor of the rechargeable power tool based on a rotation speed set by a speed setting unit operated by a user. The drive unit rotates the direct current motor in accordance with the driving duty ratio set by the duty ratio setting unit. The operation amount detecting unit detects at least one type of operation amount which directly or indirectly indicates an operation state of the rechargeable power tool excluding a current value of the direct current motor when the direct current motor is rotated by the driving unit. The abnormality determining unit compares the operation amount detected by the operation amount detecting unit and a determination threshold set based on the operation amount to thereby determine whether or not the operation state of the rechargeable power tool is abnormal. The determination threshold setting unit that sets the determination threshold in a continuous or stepwise manner in accordance with the rotation speed set by the speed setting unit.

According to the control unit of the second aspect of the present invention, since the determination threshold is set to be changed in a continuous or stepwise manner according to the set rotation speed, appropriate determination thresholds may be sequentially set to the rotation speeds from time to time. Accordingly, despite the set rotation speed, an abnormal state of the rechargeable power tool can be reliably detected.

A program recorded in a recording medium in a third aspect of the present invention causes a computer to execute a driving duty ratio setting step, a direct current motor rotating step, an operation amount detecting step, a determining step, and a determination threshold setting step. In the driving duty ratio setting step, a driving duty ratio for PWM controlling a direct current motor of a rechargeable power tool is set based on a rotation speed set by a speed setting unit operated by a user. In the direct current motor rotating step the direct current motor is rotated in accordance with the set driving duty ratio. In the operation amount detecting step, at least one type of operation amount which directly or indirectly indicates an operation state of the rechargeable power tool excluding a current value of the direct current motor is detected when the direct current motor is rotated. In the determining step, the detected operation amount and a determination threshold set based on the operation amount are compared to thereby determine whether or not the operation state of the rechargeable power tool is abnormal. In the determination threshold setting step, the determination threshold is set in a continuous or stepwise manner in accordance with the rotation speed set by the speed setting unit.

According to the program recorded in a recording medium of the third aspect of the present invention, since the determination threshold is set to be changed in a continuous or stepwise manner according to the set rotation speed, appropriate determination thresholds may be sequentially set to the rotation speeds from time to time. Accordingly, despite the set rotation speed, an abnormal state of the rechargeable power tool can be reliably detected.

BRIEF DESCRIPTION OF THE DRAWINGS

The present invention will now be described in an embodiment by way of example with reference to the accompanying drawings, in which:

FIGS. 4A-4C are explanatory views showing the DUTY (driving duty ratio), a lock determination time, and a voltage detection threshold for the drawing amount (LEVEL) of the trigger switch per speed mode.

DETAILED DESCRIPTION OF THE PREFERRED EMBODIMENTS

Figure 1:
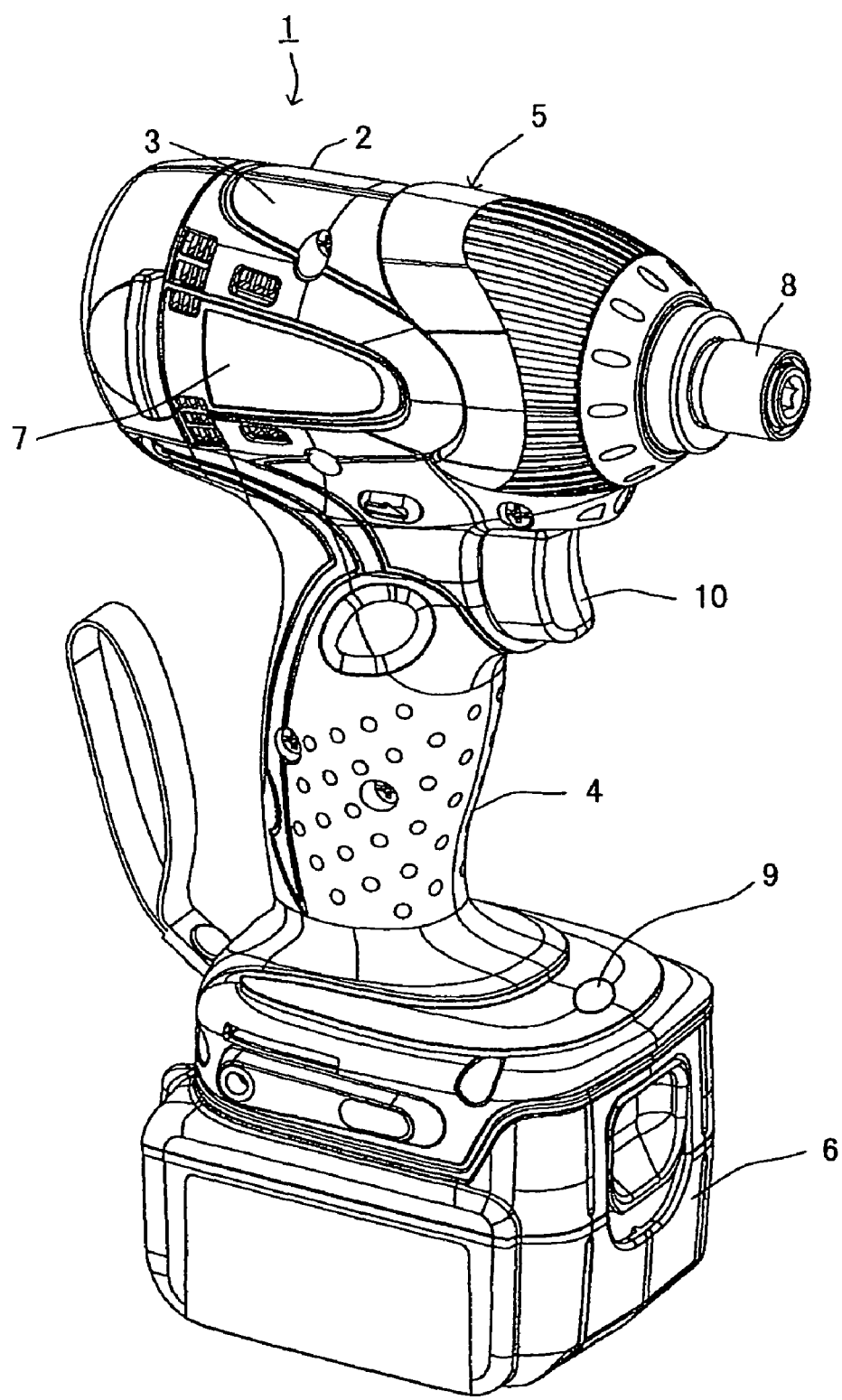
FIG. 1 is a perspective view showing an appearance of a rechargeable impact driver in an embodiment according to the present invention.

As shown in FIG. 1, a rechargeable impact driver 1 in the embodiment of the present invention is formed by assembling right and left half housings 2, 3, and includes a body housing 5 with a handle portion 4 provided in an extending manner in a lower part thereof and a battery pack 6 to be attachably/detachably mounted in a lower end of the handle portion 4 of the body housing 5.

A motor housing portion 7 for housing a direct current (DC) motor 20 (see FIG. 2) as a power source of the rechargeable impact driver 1 is provided at a rear (on a left side in FIG. 1) of the body housing 5. A decelerating mechanism and a percussion mechanism are housed ahead of the motor housing portion 7. A chuck sleeve 8 for attaching a tool bit (not shown) to a top end of the percussion mechanism is extendingly provided to a front of the body housing 5.

The percussion mechanism including, for example, a spindle rotated through the deceleration mechanism, a hammer rotated with the spindle and movable in an axial direction and an anvil provided at a front of the hammer to facilitate attachment of the tool bit thereto. The percussion mechanism operates as follows:

Specifically, in the percussion mechanism, when the spindle is rotated following a rotation of the DC motor 20, the anvil is rotated through the hammer, causing the tool bit (e.g., driver bit) to be rotated. Subsequently, when screw tightening by the tool bit proceeds and a load on the anvil is increased, the hammer retreats against a biasing force of a coil spring to depart from the anvil and then rotates with the spindle, and to advance by a biasing force of a coil spring to again engage with the anvil to provide a intermittent percussion, thereby performing additional tightening.

Since such a percussion mechanism is well-known (see, for example, Japanese Unexamined Patent Publication No. 2006-0218605), a detailed explanation thereof is omitted here.

The handle portion 4 of the body housing 5 includes a trigger switch 10 operable by a user while gripping the handle portion 4.

Below the handle portion 4 of the body housing 5, a push-button speed selector 9 is provided to set a speed mode of the DC motor 20 (and a speed mode of the tool bit).

The rechargeable impact driver 1 of the present embodiment is configured such that the speed mode is switched among three modes, that is, high-speed mode, medium-speed mode, and low-speed mode by user operation on the speed selector 9. Per the speed mode, a maximum rotation speed (maximum driving duty ratio) of the DC motor 20 is differently set. The maximum rotation speed at high-speed mode is the highest while the maximum rotation speed at low-speed mode is the lowest.

When a user operates the trigger switch 10, the DC motor 20 is rotated at a set rotation speed in accordance with an operation amount (a drawing amount) of the trigger switch 10 up to the maximum rotation speed of the corresponding speed mode set with the speed selector 9.

The battery pack 6 includes a battery 18 (see FIG. 2) in which rechargeable batteries having a predetermined voltage are connected in series. The handle portion 4 houses a drive unit that operates by receiving power supply from the battery 18 inside the battery pack 6 and rotates the DC motor 20 while the trigger switch 10 is being operated.

Figure 2:
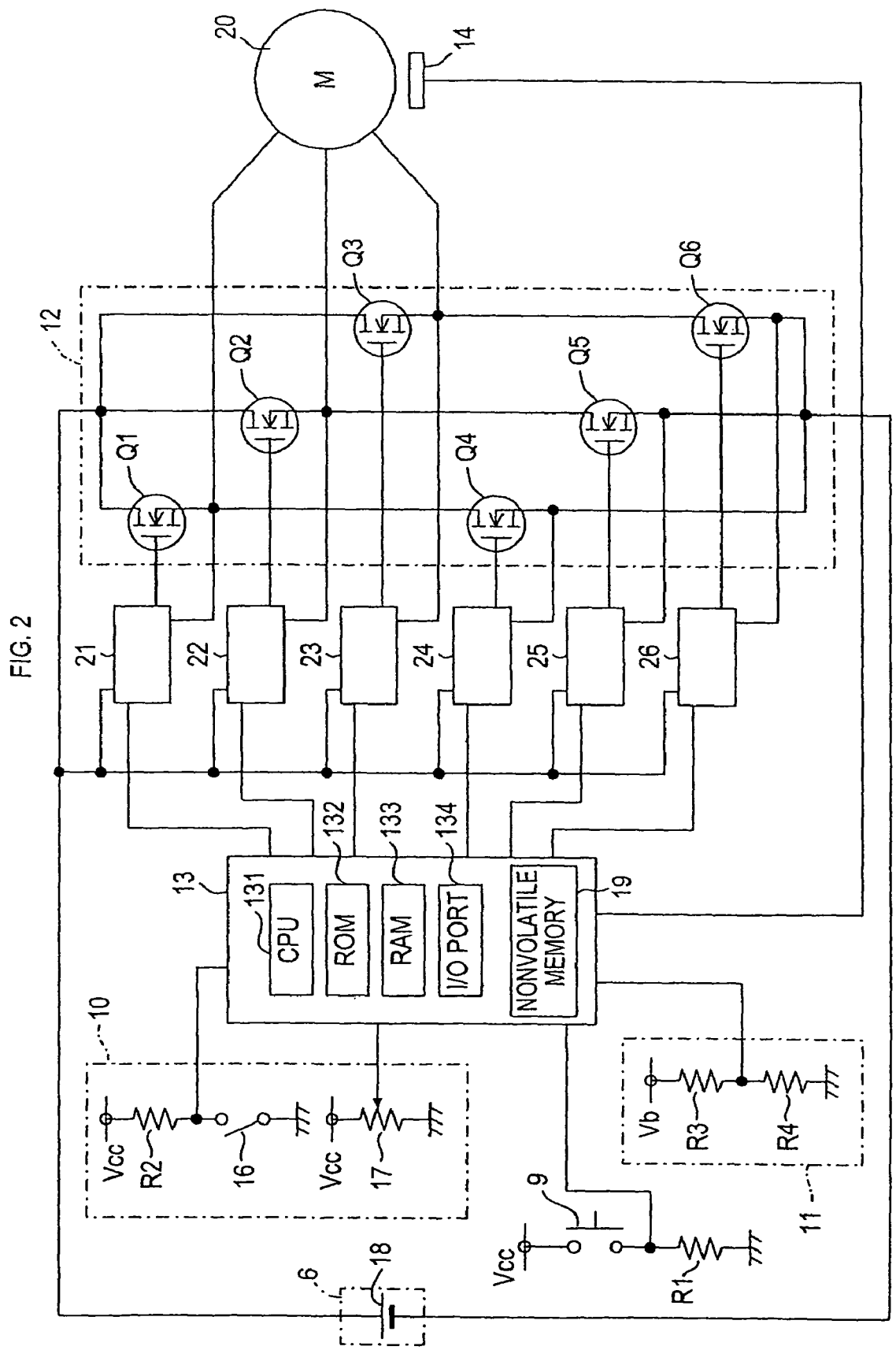
FIG. 2 is an electrical circuit diagram showing a configuration of a drive unit of a direct current motor in the embodiment.

As shown in FIG. 2, the DC motor 20 in the embodiment is constituted as a three-phase brushless motor, in which terminals for respective phases of the DC motor 20 are connected to the battery pack 6 (particularly to the battery 18) as a DC power source through a motor driving circuit 12.

The motor driving circuit 12 is configured as a bridge circuit which includes three switching devices Q1-Q3 as so-called high-side switches and three switching devices Q4-Q6 as so-called low-side switches. The switching devices Q1-Q3 connect respective terminals for respective phases of the DC motor 20 to a positive side of the battery 18, while the switching devices Q4-Q6 connect respective terminals of the DC motor 20 to a negative side of the battery 18.

The switching devices Q1-Q6 constituting the motor driving circuit 12 include n-channel FETs, and gate circuits 21-26, which turn on the switching devices Q1-Q6 by applying drive voltages equal to or exceeding threshold values between gates and sources of the switching devices Q1-Q6, are connected to the respective switching devices Q1-Q6. The gate circuits 21-26 are adapted for individually turning on/off the switching devices Q1-Q6 in the motor driving circuit 12. The gate circuits 21-26 are controlled by a controller 13.

Specifically, when the trigger switch 10 is operated, the controller 13 turns on/off the switching devices Q1-Q6 in the motor driving circuit 12 through the respective gate circuits 21-26 based on a detection signal from a rotation position sensor 14 provided to the DC motor 20 to thereby control current flow to respective phase windings of the DC motor 20 and rotate the DC motor 20. Control signals to drive the respective switching devices Q1-Q6 are inputted from the controller 13 to the respective gate circuits 21-26.

The rotation position sensor 14 includes one or more of hole ICs and outputs a pulse signal to the controller 13 in accordance with a rotation position of the DC motor 20 (i.e., each time the DC motor 20 is rotated a predetermined amount). The controller 13 calculates the rotation position and a rotation speed of the DC motor 20 based on the pulse signal from the rotation position sensor 14 to thereby PWM control the DC motor 20 such that the rotation speed coincides with a set rotation speed defined by operation states of the speed selector 9 and the trigger switch 10.

The driving unit includes a not shown constant voltage power source device that generates a constant voltage power source which is a voltage of the battery 18 stepped down to a constant voltage Vcc (e.g., 5 V). The constant voltage power source (Vcc) is used as a power source for operating prescribed circuits inside the driving unit, including the controller 13.

The speed selector 9 is a known push button normally open. One end of the speed selector 9 is connected to a constant voltage power source line having the constant voltage Vcc, while the other end of the speed selector 9 is connected to a ground line (ground potential) through a resistor R1 as well as to a prescribed port (a speed selector signal input port) of the controller 13. In other words, a speed selector signal in accordance with the operation state of the speed selector 9 is inputted to the speed selector signal input port of the controller 13.

Owing to the above configuration, a contact of the speed selector 9 is open at normal times. Thus, the speed selector signal input port of the controller 13 is in a grounded state through the resistor R1. In other words, the speed selector signal inputted to the speed selector signal input port of the controller 13 from the speed selector 9 is a signal of low level (0 V). On the other hand, when a user pushes the speed selector 9 and the contact is closed, the speed selector signal input port of the controller 13 has the same potential as the constant voltage Vcc of the constant voltage power source through the speed selector 9. In other words, the speed selector signal inputted to the speed selector signal input port of the controller 13 from the speed selector 9 is a signal of high level (5 V). When the user stops push operation, the speed selector 9 is open again by an elastic force of a spring.

In the controller 13, a speed mode of the DC motor 20 is set in accordance with user operation on the speed selector 9. Specifically, when the user performs push operation by pushing the speed selector 9 once, the speed selector signal inputted to the controller 13 is changed from low to high level during the push operation. The controller 13 sequentially changes the speed mode from high, which is default, to medium, to low, and then back to high mode each time the speed selector signal is changed from low to high level (i.e., each time the user performs the push operation).

One method of making the user recognize at which speed mode the rechargeable impact driver 1 is currently set is, for example, to produce a notification sound corresponding to the selected speed mode each time the speed selector 9 is operated, or to provide LEDs and the like to be lighted in accordance with the selected speed mode. Of course the above methods are some of the examples.

The trigger switch 10 more particularly includes a driving start switch 16 and a variable resistor 17 as shown in FIG. 2. One end of the driving start switch 16 is connected to the constant voltage Vcc through a resistor R2 as well as to a predetermined port (a driving start signal input port) of the controller 13, while the other end of the driving start switch 16 is connected to a ground line.

The variable resistor 17 is configured as a so-called potentiometer. The variable resistor 17 inputs a voltage (a trigger operation amount signal) in accordance with the operation amount (the drawing amount) of the trigger switch 10 to a trigger operation amount signal input port of the controller 13, with the constant voltage Vcc as a power source.

Owing to such configuration, as the user starts drawing (e.g., draws a little) the trigger switch 10, the driving start switch 16 is turned on thereby causing a drive start signal indicating an on-state of the driving start switch 16 to be inputted to the controller 13. The controller 13, when the driving start signal is inputted, starts PWM controlling the DC motor 20 following the trigger operation amount signal from the variable resistor 17 so as to rotate the DC motor 20 at a rotation speed in accordance with the operation amount (the drawing amount) of the trigger switch 10 indicated by the trigger operation amount signal.

In other words, up to the maximum rotation speed corresponding to the speed mode set by the speed selector 9, the driving duty ratio of the motor driving circuit 12 is set such that the larger the drawing amount of the trigger switch 10 is, the larger the rotation speed is (i.e., the higher the driving duty ratio is). In a state where the user has drawn the trigger switch 10 up to the limit, the driving duty ratio is a value corresponding to a maximum rotation speed of the selected speed mode.

Figure 3:
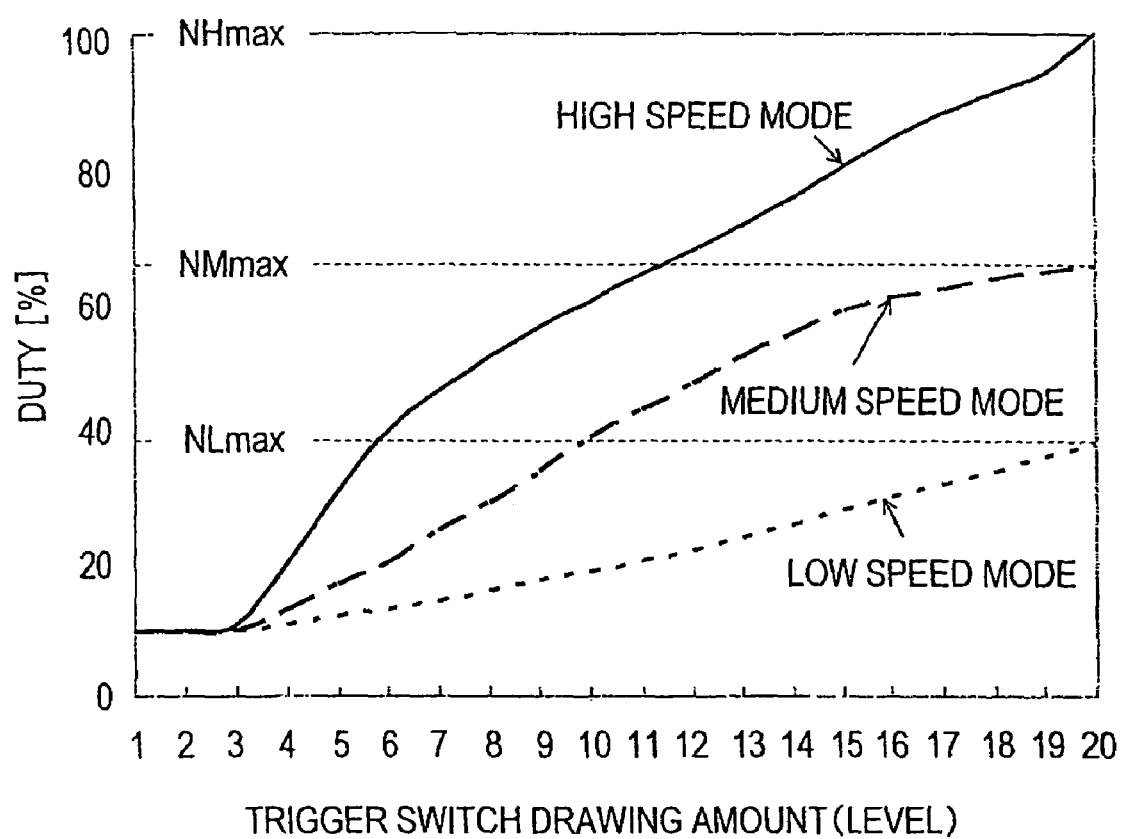
FIG. 3 is an explanatory view illustrating an outline of change in a DUTY (driving duty ratio) for a drawing amount (LEVEL) of a trigger switch per speed mode.

As shown in FIG. 3, in the present embodiment, the drawing amount of the trigger switch 10 is selected from twenty levels (LEVEL 1 to LEVEL 20). Per each level (LEVEL), a DUTY (driving duty ratio) is specified. The DUTY for the drawing amount (LEVEL) of the trigger switch 10 is increased (partly unchanged) in either of the speed modes as the drawing amount is increased.

An increasing manner of the DUTY is different per the selected speed mode. At high mode, the DUTY is increased toward the largest DUTY (NHmax; 100% in the present embodiment) as the drawing amount of the trigger switch 10 is increased. When the user fully draws the trigger switch 10 to the limit, the DUTY becomes the maximum NHmax. At medium mode, the DUTY is increased toward the largest DUTY (NMmax; 65% in the present embodiment) as the drawing amount of the trigger switch 10 is increased. When the user fully draws the trigger switch 10 to the limit, the DUTY becomes the maximum NMmax. At low mode, the DUTY is increased toward the largest DUTY (NLmax; 38% in the present embodiment) as the drawing amount of the trigger switch 10 is increased. When the user fully draws the trigger switch 10 to the limit, the DUTY becomes the maximum NLmax.

The change in DUTY shown in FIG. 3 schematically indicates the manner of change in DUTY for the drawing amount of the trigger switch 10. A particular value of the DUTY for each drawing amount is as shown in FIGS. 4A-4C. FIGS. 4A-4C are explanatory views showing the DUTY (driving duty ratio), a lock determination time, and a voltage detection threshold for the drawing amount (LEVEL) of the trigger switch per speed mode. The lock determination time and the voltage detection threshold will be described later.

As described in the above, the controller 13 sets the driving duty ratio for PWM controlling the DC motor 20 based on the speed mode set by the speed selector 9 and the rotation speed corresponding to the trigger operation amount signal from the trigger switch 10 to thereby duty drive the switching devices in the motor driving circuit 12 according to the driving duty ratio. As a result, current flow to each phase of the DC motor 20 is controlled. The DC motor 20 is rotated at the rotation speed corresponding to the set speed mode and the operation amount of the trigger switch 10. Thereby, a tool output shaft (the chuck sleeve 8 and the tool bit) is driven.

The driving unit of the present embodiment includes a battery voltage detection circuit 11 for detecting a battery voltage Vb. The battery voltage detection circuit 11 is an ordinary circuit including two voltage divider resistors R3, R4 connected in series for dividing the battery voltage Vb. The battery voltage after divided by the two voltage divider resistors R3, R4 is inputted to the battery voltage detection signal input port of the controller 13 as a battery voltage detection signal. Also to the controller 13, the pulse signal from the rotation position sensor 14 is inputted as previously described.

The controller 13 determines whether or not the rechargeable impact driver 1 is in an abnormal state where an excess current is generated in the DC motor 20, based on both the battery voltage detection signal from the battery voltage detection circuit 11 and the pulse signal from the rotation position sensor 14. Hereinafter, detailed description will be given on determination of an abnormal state.

Firstly, explanation is given on the determination of an abnormal state based on the battery voltage detection signal from the battery voltage detection circuit 11. When the rechargeable impact driver 1 comes into an abnormal state and an excess current flows into the DC motor 20, the battery voltage Vb becomes lower than normal. Therefore, a voltage detection threshold Vt is preset for a value of the battery voltage Vb indicated by the battery voltage detection signal. Then, determination of an abnormal state can be made when the battery voltage Vb falls below the voltage detection threshold Vt.

As in the conventional excess current detection method based on the battery voltage, if the voltage detection threshold Vt is fixed to a constant value, accurate determination (detection) of an abnormal state may not be made depending on the selected speed (driving duty ratio).

Considering the change of the battery voltage for the driving duty ratio, the larger the driving duty ratio is, the longer the period of application of current is (the switching devices are turned on) in PWM control, and thus the lower the battery voltage becomes.

Accordingly, even in an excess current state, decrease in the battery voltage is not so large in the case of a small driving duty ratio. Therefore, the voltage detection threshold Vt can be set to a relatively large value. In case that the voltage detection threshold Vt is too small and the driving duty ratio is small, the battery voltage Vb does not fall below the voltage detection threshold Vt even in an excess current state as previously mentioned. An excess current state may not be able to be detected.

On the other hand, the larger the driving duty ratio is, the larger the decrease in the battery voltage. Accordingly, the voltage detection threshold Vt can be set to a relatively small value. In case that the voltage detection threshold Vt is too large and the driving duty ratio is large, the battery voltage Vb falls below the voltage detection threshold Vt even in a normal state as previously mentioned. An excess current state may be mistakenly detected.

In the present embodiment, the voltage detection threshold Vt is not fixed to a constant value but is set lower as the driving duty becomes large. Particularly, as shown in FIGS. 4A-4C, per the speed mode (high, medium and low speed mode) set by the operation of the speed selector 9, the larger the DUTY becomes in accordance with the drawing amount (LEVEL) of the trigger switch 10, the smaller the voltage detection threshold Vt is set. Conversely, the voltage detection threshold Vt is set higher as the DUTY becomes smaller.

Now, explanation is given on determination of an abnormal state based on the pulse signal from the rotation position sensor 14. During use of the rechargeable impact driver 1, when the DC motor 20 comes into a locked state due to abnormality or the like of an impact mechanism, an abnormal state is generated where an excess current flows into the DC motor 20. Thus, a locked state must be promptly detected so that protective operation such as interruption of the applied current is performed.

To determine a locked state, a lock determination time Tr which is a time for determination is preset. In case that the pulse signal from the rotation position sensor 14 is not inputted during the lock determination time Tr, a locked state can be determined.

As previously noted, however, if the lock determination time Tr is fixed to a constant value, a locked state may not be able to be accurately and promptly determined (detected) depending on the selected speed (driving duty ratio).

Considering the change of the rotation speed for the driving duty ratio, the larger the driving duty ratio is the larger the rotation speed becomes and the more number of pulse signals are inputted to the controller 13 from the rotation position sensor 14 per unit time. Accordingly, if the driving duty ratio is large, the lock determination time Tr can be set relatively short. In case that the lock determination time Tr is too long and the driving duty ratio is large, a locked state is not immediately detected although the DC motor 20 is in a locked state and an excess current continues to flow in as previously mentioned. The DC motor 20 may be adversely affected.

On the other hand, the smaller the driving duty ratio is, the smaller the rotation speed becomes and the fewer number of pulse signals are inputted to the controller 13 from the rotation position sensor 14 per unit time. Accordingly, if the driving duty ratio is small, the lock determination time Tr can be set relatively long. In case that the lock determination time Tr is too short and the driving duty ratio is small, a locked state is mistakenly determined although the DC motor 20 is not in a locked state but is rotated normally at low speed as previously mentioned. Actual operation by the user may be affected.

In the present embodiment, the lock determination time Tr is not fixed to a constant value but is set shorter as the driving duty ratio becomes larger. Particularly, as shown in FIGS. 4A-4C, per the speed mode (high, medium or low speed mode) set by the operation of the speed selector 9, the larger the DUTY becomes in accordance with the drawing amount (LEVEL) of the trigger switch 10, the shorter the lock determination time Tr is set. Conversely, the lock determination time is set longer as the DUTY becomes smaller.

The controller 13 in the embodiment is a microcomputer which includes at least a CPU 131, a ROM 132, a RAM 133 and an input/output (I/O) port 134. In the controller 13, the CPU 131 performs various processings according to a program stored in the ROM 132.

Respective values of the DUTY, lock determination time, and voltage detection threshold for the speed mode and the drawing amount (LEVEL) of the trigger switch 10 shown in FIGS. 4A-4C are stored in a nonvolatile memory 19 inside the controller 13.

Figure 5:
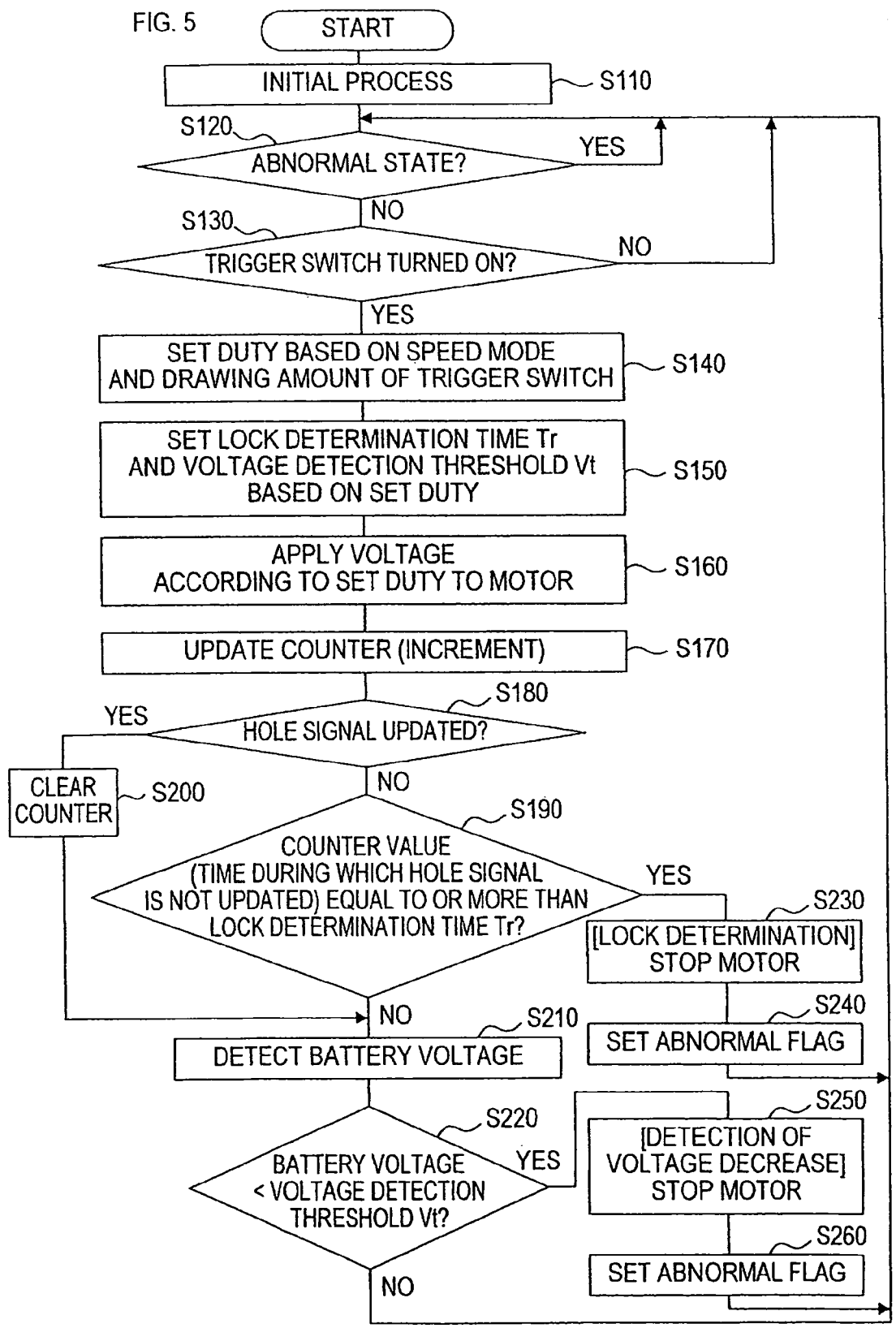
FIG. 5 is a flowchart showing a control process performed by a controller in order to drive the direct current motor.

A control process performed by the controller 13 will be described hereinafter with reference to the flowchart in FIG. 5. In the rechargeable impact driver 1 of the present embodiment, the controller 13 is started when the battery pack 6 is attached to the lower end of the handle portion 4 and a power source is supplied to respective portions of the driving unit (FIG. 2). The controller 13 then performs the control process shown in FIG. 5 according to a control processing program stored in the ROM 132.

When the control process is started, an initial process is firstly performed (S110). Here, various initialization processes are performed necessary for operation of the controller 13 including a process which clears a later-described counter. When the initial process is completed, it is determined whether or not the rechargeable impact driver 1 is in an abnormal state (S120).

The determination is performed based on an abnormal flag preset inside the controller 13. As long as the rechargeable impact driver 1 is in a normal state, the abnormal flag is reset. The process proceeds from S120 to S130. Once the abnormal flag is set in a later-described step of S240 or S260 due to the fact that the rechargeable impact driver 1 is turned into a abnormal state, the abnormal flag is kept set unless the controller 13 is again initialized (i.e., while the controller 13 is continued to be operated). Thus, after the abnormal flag is set, positive determination is continuously made in S120 and the process does not move to S130 and onwards.

When the process proceeds to S130 by the fact that it is determined that the rechargeable impact driver 1 is not in an abnormal state in the determination step of S120, it is then determined whether or not the trigger switch 10 in an ON state by user operation. This determination is particularly made based on whether or not the driving start switch 16 included in the trigger switch 10 is in an ON state. When it is determined that the trigger switch 10 is not in an ON state (i.e., the driving start switch 16 is not in an ON state), the process returns to S120. If the trigger switch 10 is in an ON state, the process proceeds to S140.

In S140, the driving duty ratio (DUTY) is set based on the speed mode (either of high, medium, or low speed mode) set by the speed selector 9 and the drawing amount of the trigger switch 10. The DUTY is set in accordance with the value (see FIGS. 4A-4C) stored in the nonvolatile memory 19 as previously noted. For example, when the trigger switch 10 is drawn to LEVEL 10 at high speed mode, the DUTY is set to 58%.

When the DUTY is set, the lock determination time Tr and the voltage detection threshold Vt corresponding to the set DUTY are set in S150. These values (Tr and Vt) are also set according to the values (see FIGS. 4A-4C) stored in the nonvolatile memory 19. For example, when the trigger switch 10 is drawn to LEVEL 20 at medium speed mode, the lock determination time Tr is set to 0.2 seconds and the voltage detection threshold Vt is set to 9.3 V.

When the lock determination time Tr and the voltage detection threshold Vt are set, a voltage corresponding to the DUTY set in S140 is applied to the DC motor 20 in S160. Specifically, application of current to the DC motor 20 is PWM controlled in the set DUTY.

In S170, a value of the counter is updated (incremented). In S180, it is determined whether or not a hole signal, i.e., a pulse signal from the rotation position sensor 14 including the hole IC, is updated. Specifically, after the counter is cleared in S110 or in S200, whether or not a hole signal is newly inputted is determined. If the hole signal is updated, the counter is cleared in S200 and the process proceeds to S210. If the whole signal is not updated, the process proceeds to S190 and it is determined whether or not the current counter value (i.e., duration time of a state where the hole signal is not updated as well as elapsed time since the hole signal is previously updated) is equal to or more than the lock determination time Tr.

If the current counter value has not reached the lock determination time Tr, the process proceeds to S210 to thereby detect the battery voltage Vb. In S220, it is determined whether or not the detected battery voltage Vb is lower than the voltage detection threshold Vt. If the battery voltage Vb is equal to or more than the voltage detection threshold Vt, the process returns to S120 and proceeds onwards.

On the other hand, if a state where the hole signal is not updated continues for the lock determination time Tr or more, the counter value also reaches the lock determination time Tr. In that case, positive determination is made in S190 and the process proceeds to S230. In S230, an abnormal state (here, a locked state of the DC motor 20) is determined so that the respective switching devices of the motor driving circuit 12 are turned off to thereby stop application of current to the DC motor 20. In S240, the abnormal flag is set and the process returns to S120.

When the battery voltage Vb falls below the voltage detection threshold Vt, positive determination is made in S220 and the process proceeds to S250. In S250, an abnormal state (here, decrease in the battery voltage due to an excess current) is determined so that the respective switching devices of the motor driving circuit 12 are turned off to thereby stop application of current to the DC motor 20. In S260, the abnormal flag is set and the process returns to S120.

As described above, in the rechargeable impact driver 1 in the present embodiment, the speed mode can be set to either high, medium or low speed mode by user operation on the speed selector 9 and the driving duty ratio of the DC motor 20 is set, as shown in FIGS. 4A-4C, depending on the selected speed mode and the drawing amount (LEVEL) of the trigger switch 10 drawn by the user. Also, an abnormal state of the tool can be detected based on the pulse signal (hole signal) from the rotation position sensor 14 and the battery voltage Vb. The threshold used upon the detection is set to a different value depending on the driving duty ratio. Particularly, as shown in FIGS. 4A-4C, the voltage detection threshold Vt used for detecting an abnormal state based on the battery voltage Vb is set lower as the driving duty becomes larger. Also, the lock determination time Tr used for detecting an abnormal state (locked state) based on the hole signal is set to shorter as the driving duty ratio becomes larger.

Therefore, according to the rechargeable impact driver 1 in the present embodiment, an abnormal state in which an excess current flows into the DC motor 20 in the rechargeable impact driver 1 is determined based on both the battery voltage Vb and the hole signal. An abnormal state can be reliably determined.

Since the voltage detection threshold Vt used for determining an abnormal state based on the battery voltage Vb is set lower as the set rotation speed is larger (as the driving duty ratio is larger), determination of an abnormal state based on decrease in the battery voltage Vb can be reliably performed despite the set rotation speed.

Furthermore, the lock determination threshold Tr used for determining an abnormal state based on the hole signal is set short as the set rotation speed is larger (as the driving duty ratio is larger). Determination of an abnormal state based on decrease in the battery voltage Vb can be reliably and promptly performed despite the set rotation speed.

Although one embodiment of the present invention has been described above, it is to be understood that the present invention should not be limited to the above embodiment, but may be embodied in various forms within the technical scope of the present invention.

For example, the present invention can be applied to a rechargeable impact driver which is not provided with the speed selector 9 and is configured to set the driving duty ratio simply in accordance with the drawing amount of the trigger switch 10. Particularly, for example, the driving duty ratio, the lock determination time Tr, and the voltage detection threshold Vt can be set using either of the values in FIGS. 4A-4C (e.g., the values at high speed mode in FIG. 4C). In other words, the driving duty ratio may be set higher as the drawing amount of the trigger switch is larger, and the lock determination time Tr may set shorter and the voltage detection threshold may be set lower as the driving duty ratio is higher.

The present invention can be applied even to a rechargeable impact driver configured such that the trigger switch 10 is a switch merely for turning on/off of driving of the DC motor 20 and that the rotation speed of the DC motor 20 is set only by the speed selector 9 regardless of the drawing amount of the trigger switch 10, for example, by setting the respective values at LEVEL 20 of FIG. 4A in the case of low speed mode, setting the respective values at LEVEL 20 of FIG. 4B in the case of medium speed mode, and setting the respective values at LEVEL 20 of FIG. 4C in the case of high speed mode. In other words, the driving duty ratio may be set higher, the lock determination time Tr may set shorter and the voltage detection threshold may be set lower, as the speed mode is changed from low to medium, and to high speed mode.

In the present embodiment, an abnormal state is detected based on the battery voltage Vb and the hole signal, and, if the hole signal is not updated within the lock determination time Tr or the battery voltage Vb falls below the voltage detection threshold Vt, the rechargeable impact driver is determined in an abnormal state. However, for example, without detection of an abnormal state based on the hole signal (detection of a locked state), only an abnormality detecting function based on the battery voltage Vb may be provided, or, without detection of an abnormal state based on the battery voltage Vb, only an abnormal detecting function based on the hole signal (detection of a locked state) may be provided.

In the present embodiment, as shown in FIGS. 4A-4C, the drawing amount of the trigger switch 10 is divided into 20 levels from LEVEL 1-20. Per each LEVEL, the DUTY, the lock determination time Tr and the voltage detection threshold Vt are specified. However, this is only an example. The DUTY, the lock determination time Tr and the voltage detection threshold Vt may be divided into more details (to be different) per each LEVEL, or may be set more roughly such that, for example, the same values are used respectively for LEVEL 1-7, LEVEL 8-14, and LEVEL 15-20.

To sum up, as long as the lock determination time Tr becomes shorter and the voltage detection threshold Vt becomes lower as the DUTY becomes larger as a whole, what values or detailed values to what extent are set for the respective parameters can be arbitrarily determined.

In the above embodiment, the speed mode can be changed among three modes of high, medium and low speed modes. However, the speed mode may be changed, for example, between two modes or among four or more modes. Or, the speed mode can be made switchable in a continuous (non-stepwise) manner.

In the above embodiment, the rotation position sensor 14 includes the hole IC. However, as long as the rotation position and rotation speed of the DC motor 20 can be detected, particular configuration of the rotation position sensor 14 is not limited.

Further, while the switching devices in the motor driving circuit 12 are all constituted by n-channel FETs in the above embodiment, a p-channel FET, for example, may be used as a high side switch. Alternatively, bipolar transistors may be used as the respective switching devices.

The controller 13, which is constituted by a microcomputer in the above embodiment, may be constituted by an ASIC (Application Specific Integrated Circuits) or a programmable logic device, such as FPGA (Field Programmable Gate Array).

While the present invention is applied to a drive unit configured to drive a three-phase brushless DC motor by turning on/off six switching devices, the present invention may be applied to a drive unit configured to drive a brushed DC motor by turning on/off one switching device. The present invention also may be applied to a drive unit configured to drive a brushed DC motor by turning on/off four switching devices which form a so-called H-bridge circuit (full-bridge circuit). The present invention further may be applied to a drive unit configured to drive a brushed DC motor by turning on/off two switching devices which form a so-called push-pull circuit (half-bridge circuit).

While the ROM 132 in the controller 13 is used as the recording medium for the program of the control process in the above embodiment, the RAM 133 may be used instead of the ROM 132.

Also, the program of the control process may be recorded in computer-readable recording media other than a ROM and a RAM. Such recording media include, for example, a flexible disk (FD), an optical disk (MO), a DVD, a CD-ROM, a Blu-Ray disk, a HD-DVD, a hard disk, and a portable semiconductor memory (e.g., a USB memory, a memory card, etc.).

Further, the program of the control process may be provided to the controller 13 through a network.

Also, while the present invention is applied to a rechargeable impact driver in the above described embodiment, the present invention may be applied to any electric power tool provided with a DC motor as a power source in a same manner as in the above described embodiment to achieve the same effects. Some examples for such electric power tool are: a rechargeable impact wrench used by attaching a socket or the like to an anvil for fastening bolts, screws and the like; a rechargeable driver drill used by attaching various bits and drills to a drill chuck to bore a workpiece material; a rechargeable hand saw for cutting a workpiece material with a saw blade; a rechargeable grinder used by attaching a whetstone to a shaft for grinding an edged tool and so on.

What is claimed is:

1. A rechargeable power tool comprising:
   a direct current motor that is rotated by electric power supplied from a direct current power source and drives a tool output shaft;
   a switching circuit that includes at least one switching device provided on a current path from the direct current power source to the direct current motor;
   at least one speed setting unit that is operated by a user to set a rotation speed of the direct current motor;
   a duty ratio setting unit that sets a driving duty ratio for PWM controlling the direct current motor through the switching circuit based on the rotation speed set by operation of the speed setting unit;
   a drive unit that turns on/off the at least one switching device in the switching circuit in accordance with the driving duty ratio set by the duty ratio setting unit to thereby rotate the direct current motor;
   an operation amount detecting unit that detects at least one type of operation amount which directly or indirectly indicates an operation state of the rechargeable power tool excluding a current value of the direct current motor when the direct current motor is rotated by the driving unit;
   an abnormality determining unit that compares the operation amount detected by the operation amount detecting unit and a determination threshold set based on the operation amount to thereby determine whether or not the operation state of the rechargeable power tool is abnormal; and a determination threshold setting unit that sets the determination threshold in a continuous or stepwise manner in accordance with the rotation speed set by the speed setting unit.

2. The rechargeable power tool according to claim 1, wherein the direct current power source is a rechargeable battery, the operation amount detecting unit detects voltage of the rechargeable battery as the operation amount, the determination threshold setting unit sets the voltage threshold as a determination threshold to a lower value as the rotation speed set by the speed setting unit is larger, and the abnormality determining unit determines that the operation state of the rechargeable power tool is abnormal in case that the voltage of the rechargeable battery detected by the operation amount detecting unit is lower than the voltage threshold.

3. The rechargeable power tool according to claim 1, wherein the operation amount detecting unit outputs a detection signal as the operation amount each time the direct current motor is rotated a constant amount, the determination threshold setting unit sets a time threshold as the determination threshold to a lower value as the rotation speed set by the speed setting unit is larger, and the abnormality determining unit determines that the operation state of the rechargeable power tool is abnormal in case that the time during which the detection signal is not outputted from the operation amount detecting unit is equal to or more than the time threshold.

4. The rechargeable power tool according to claim 1, wherein the direct current power source is a rechargeable battery, the operation amount detecting unit detects the voltage of the rechargeable battery as one of the operation amount and outputs a detection signal as one of the operation amount each time the direct current motor is rotated a constant amount;

the determination threshold setting unit sets the voltage threshold and the time threshold as the determination threshold such that the voltage threshold is lower as the rotation speed set by the speed setting unit is larger and the time threshold is shorter as the rotation speed set by the speed setting unit is larger; and the abnormality determining unit determines that the operation state of the rechargeable power tool is abnormal in one of the cases in which the voltage of the rechargeable battery detected by the operation amount detecting unit is lower than the voltage threshold and in which the time without output of the detection signal from the operation amount detecting unit is equal to or more than the time threshold.

5. The rechargeable power tool according to claim 1, wherein the speed setting unit includes a speed selector that is used for selectively setting the rotation speed of the direct current motor by user operation to at least two modes, and the duty ratio setting unit sets the driving duty ratio based on the operation state of the speed selector.

6. The rechargeable power tool according to claim 1, wherein the speed setting unit includes a trigger switch that is used for setting the rotation speed of the direct current motor in accordance with the operation amount by a user, and the duty ratio setting unit sets the driving duty ratio in accordance with the operation amount of the trigger switch.

7. The rechargeable power tool according to claim 1, wherein the speed setting unit includes:

a speed selector that is used for selectively setting a speed mode of the direct current motor by user operation to at least two modes; and a trigger switch that is used for setting the rotation speed of the direct current motor in accordance with the operation amount by a user, and the duty ratio setting unit sets the driving duty ratio in accordance with the operation amount of the trigger switch and such that a maximum driving duty ratio which is the driving duty ratio when the operation amount is the largest is different per speed mode.

8. The rechargeable power tool according to claim 1, further comprising:

a protecting unit that protects the direct current motor by stopping application of current to the direct current motor when it is determined by the abnormal determining unit that the operation state of the rechargeable power tool is abnormal.

9. A control unit of a rechargeable power tool comprising:

a duty ratio setting unit that sets a driving duty ratio for PWM controlling a direct current motor of the rechargeable power tool based on a rotation speed set by a speed setting unit operated by a user;

a drive unit that rotates the direct current motor in accordance with the driving duty ratio set by the duty ratio setting unit;

an operation amount detecting unit that detects at least one type of operation amount which directly or indirectly indicates an operation state of the rechargeable power tool excluding a current value of the direct current motor when the direct current motor is rotated by the driving unit;

an abnormality determining unit that compares the operation amount detected by the operation amount detecting unit and a determination threshold set based on the operation amount to thereby determine whether or not the operation state of the rechargeable power tool is abnormal; and a determination threshold setting unit that sets the determination threshold in a continuous or stepwise manner in accordance with the rotation speed set by the speed setting unit.

10. A non-transitory computer-readable storage medium that stores a computer-readable program, program comprising instructions for causing the computer to execute:

a driving duty ratio setting step of setting a driving duty ratio for PWM controlling a direct current motor of a rechargeable power tool based on a rotation speed set by a speed setting unit operated by a user;

a direct current motor rotating step of rotating the direct current motor in accordance with the set driving duty ratio;

an operation amount detecting step of detecting at least one type of operation amount which directly or indirectly indicates an operation state of the rechargeable power tool excluding a current value of the direct current motor when the direct current motor is rotated;

a determining step of comparing the detected operation amount and a determination threshold set based on the operation amount to thereby determine whether or not the operation state of the rechargeable power tool is abnormal; and a determination threshold setting step of setting the determination threshold in a continuous or stepwise manner in accordance with the rotation speed set by the speed setting unit.

* * * * *